United States Patent Office 3,211,770
Patented Oct. 12, 1965

3,211,770
5,5,5 TRIHALO-2-PENTENYL CARBAMATES
William J. Pyne, Painesville, Ohio, assignor to Diamond Alkali Company, Cleveland, Ohio, a corporation of Delaware
No Drawing. Filed Apr. 3, 1961, Ser. No. 100,034
15 Claims. (Cl. 260—455)

This application relates to novel chemical compounds, the method of preparing these compounds, compositions containing the compounds and to methods for their use.

More specifically, this invention relates to halogenated olefinic carbamates of the general formula:

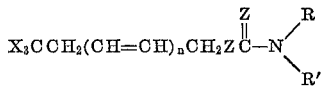

wherein X is halogen, i.e., F, Cl, Br or I, preferably Cl; R and R' may be the same or different radicals selected from the group consisting of H; alkyl, preferably lower alkyl, e.g., methyl, ethyl, propyl, butyl, amyl, hexyl, heptyl, octyl, monyl and decyl; aryl; and substituted aryl having the structure:

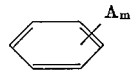

wherein A is halogen, $NO_2$, $NH_2$, CN, lower alkyl, $COOC_yH_{2y+1}$, or $SO_3C_yH_{2y+1}$;

or

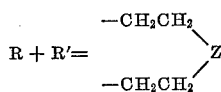

Z is O, S or NH; $n$ is a number from 1 to 5, inclusive; $m$ is a number from 0 to 5, inclusive; and $y$ is a number from 0 to 10, inclusive.

The preferred compounds of this invention are the 5,5,5-trihalo-2-pentenyl carbamates of the structure:

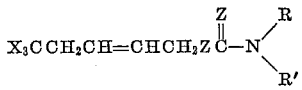

wherein X, Z, R and R' are as previously defined.

The novel carbamates in this invention may be prepared by two methods. One method of preparing the carbamate is by the reaction of an isocyanate with an alcohol of the general structure:

wherein $n$ and X are as previously defined. The isocyanate is preferably added to the alcohol, however, the order of addition may be reversed if such appears to be advisable. The molar ratio of isocyanate to alcohol may be between 1:1 and 5:1 but is preferably 1:1 to 2:1. The preferred temperature range is between 20° and 150° C., but temperatures as low as —10° or as high as 200° C. may be employed. The reaction may be carried out in the absence of a solvent or solvents may be employed such as ethers, aromatic hydrocarbons, chlorinated aliphatic or aromatic hydrocarbons, nitrobenzene, ketones, or the like. The time required for the reaction to be complete may vary from ½ hour to 24 hours, but is typically between 1 and 10 hours. The resulting carbamates may be purified by distillation, if they are liquids, or, if the carbamates are solids, they may be purified by recrystallization from solvents such as alcohols, ethers, aromatic hydrocarbons, ketones, esters, chlorinated aliphatic or aromatic hydrocarbons, and the like.

Alternatively, the carbamates may be prepared by the reaction of an amine with a haloformate of the general structure:

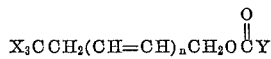

wherein X and $n$ are as previously defined and Y is chlorine, bromine or iodine. When preparing the carbamate by this method it is necessary to employ at least a 2:1 molar ratio of amine to haloformate in order to neutralize the acid formed in the reactions, but higher ratios may be advisable in certain instances. Typical solvents for the reaction are aliphatic or aromatic hydrocarbons, chlorinated aliphatic or aromatic hydrocarbons, ethylketones and the like. If the amine employed is a liquid, it may serve as the solvent with no additional solvent required.

If the amine employed is in the form of a gas, it is preferably passed into a solution of the haloformate, otherwise the order of addition is immaterial. Reaction time may vary from ½ hour to 24 hours and typically is between 1 and 10 hours. Reaction temperature is governed by the volatility of the amine, with a temperature between 0° and 30° C. being preferred when the amine is in the form of a gas. Temperatures as high as 150° C. may be employed when the amine is a liquid, but the reaction is carried out at the reflux temperature of the solvent, typically 30° to 120° C. If the product is liquid, purification may not be necessary but, where deemed advisable, this may be accomplished by a distillation. Solid products may be purified by recrystallization from a suitable solvent.

Dithiocarbamates may be prepared from an alkali metal salt of the corresponding dithiocarbamic acid and a compound of the general structure:

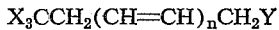

$$X_3CCH_2(CH=CH)_nCH_2Y$$

wherein X, Y and $n$ are as previously defined. The desired alkali metal salt may be prepared by adding an aqueous solution of the appropriate alkali to a mixture of an amine and carbon disulfide in water. The halide is then added to the salt solution. Conditions may be modified as necessary for the specific reactants employed and the products desired.

The compounds of the invention are effective as pesticides for controlling fungi and insects.

While it is possible to apply the compounds of the present invention in undiluted form to the plant or area to be protected, it is frequently desirable to apply the novel compounds in admixture with either solid or liquid inert, pesticidal adjuvants. Thus, the carbamates can be applied to the plants for fungicidal or insecticidal purposes, for example, by spraying them with aqueous or organic solvent dispersions of the carbamate. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketones such as acetone, methyl ethyl ketone and cyclohexanone, chlorinated hydrocarbons, such as carbon tetrachloride, chloroform, trichloroethylene, perchlorethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ethers, alcohols such as ethanol, isopropanol and amyl alcohol, etc.

The carbamates can also be applied to plants and other materials along with inert solid fungicidal or insecticidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkyl aryl sulfonates, alkyl sulfates, alkylamide sulfonates, alkyl aryl polyether alcohols, fatty acid esters of poyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units; and soaps, e.g., sodium stearate and sodium oleate. Typical surface active agents are: Aerosol OS (sodium salt of propylated naphthalenesulfonic acid); Aerosol OT [(di-2-ethylhexyl)ester of sodium sulfosuccinic acid]; Alkanol B (sodium alkylnaphthalene sulfonate); Alrosene 31 (sodium salt of modified alcohol sulfate from cocoanut fatty acids); Arctic Syntex M (sodium salt sulfonated monoglyceride of cocoanut fatty acids); Areskap 100 [o-HOC$_6$H$_4$C$_6$H$_3$(C$_4$H$_9$)(SO$_3$Na)]; Areskap 300

[(C$_4$H$_9$)(SO$_3$Na)C$_6$H$_3$C$_6$H$_5$]

Arlacel C (sorbitan sesquioleate); Arquad 12 (mainly lauryltrimethyl ammonium chloride); Arquad 18 (mainly octadecyltrimethyl ammonium chloride); Brij 35 (polyethylene glycol lauryl ether); Daxad No. 11 (sodium salt of polymerized alkylated arene sulfonic acid); Duponol LS (sodium oleyl sulfate); Duponol WA (sodium lauryl sulfate); Emulsept

[CH$_3$(CH$_2$)$_n$COOCH$_2$CH$_2$NHCOCH$_2$NC$_5$H$_5$+Cl$^-$]

Ethofats (polyethylene esters of fatty acids or rosin acids, e.g., Ethofat 3, 7, 11, 13, 15, 19, etc.); Ethomeens

e.g., Ethomeen 8, 10, 12, 14, etc.; Ethomids

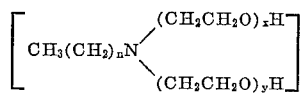

e.g., Ethomid 8, 10, 12, 14, etc.; Igepal CA (alkylphenyl polyethylene glycol ether); Igepon T (sodium N-methyl-N-oleyltaurate); Igepon A (sodium oleyl isothionate); Intramine [(RCONHCH$_2$CH$_2$OSO$_3$Na) where RCOOH is commercial lauric acid containing myristic acid]; Invadine C (sodium alkylnaphthalene sulfonate); Leonil SA (sodium dibutyl naphthalene sulfonate); Marasperse C (sodium lignin sulfonate); Maypon 4C (protein-oleyl chloride condensation product); Miranols

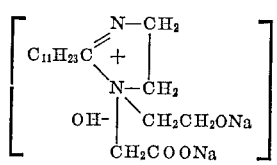

Myrj (polyethylene glycol stearate); Nacconol NR (sodium dodecyl benzene sulfonate); Wekal A (sodium salt of isopropylated naphthalene sulfonic acid); Nekal BX (sodium salt of butylated naphthalene sulfonic acid); Ninol 1281 (fatty acid ethanolamide); Nonic 218 (tertiary dodecyl polyethylene glycol thioether); Pluronics (condensation product of ethylene oxide and polypropylene glycol); Renex 25 (solidified urea complex of polyethylene glycol ester of mixed fatty and resin acids); Santomerse No. 1 (sodium dodecyl benzenesulfonate); Santomerse D (sodium decyl benzenesulfonate); Santomerse B [m-C$_6$H$_4$(COOC$_{12}$H$_{25}$)(SO$_3$Na)]; Sapamine KW

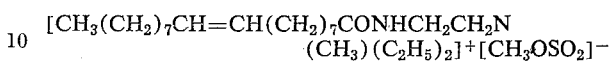

Span 20 (sorbitan monolaurate); Span 40 (sorbitan monopalmitate); Span 60 (sorbitan monostearate); Span 80 (sorbitan monooleate); Sterox CD (polyethylene glycol ester of tall oil acids); Sulframin DR (sodium salt of sulfonated condensation product of ethanolamine with a fatty acid); Tergitol 08

[C$_4$H$_9$CH(C$_2$H$_5$)CH$_2$OSO$_3$NA]

Tergitol 4

[C$_4$H$_9$CH(C$_2$H$_5$)CH$_2$CH$_2$CH(CH$_2$CH(CH$_3$)$_2$)OSO$_3$Na]

Tergitol 7

[C$_4$H$_9$CH(C$_2$H$_5$)CH$_2$CH$_2$CH(CH$_2$CH$_2$CH(C$_2$H$_5$)$_2$(OSO$_3$Na]

Triton W–30 [p-C$_8$H$_{17}$C$_6$H$_4$(OCH$_2$CH$_2$)$_2$OSO$_3$Na where C$_8$H$_{17}$ is diisobutyl]; Triton X–100

[p-C$_8$H$_{17}$C$_6$H$_4$(OCH$_2$CH$_2$)$_n$OH where C$_8$H$_{17}$ is diisobutyl]; Tween 20 [tris (polyoxyethylene) sorbitan monolaurate]; Tween 40 [tris (polyoxyethylene) sorbitan monopalmitate]; Tween 60 [tris (polyoxyethylene) sorbitan monostearate]; Tween 80 [tris (polyoxyethylene) sorbitan monooleate]; Ultrawet SK (sodium alkylbenzene sulfonate); Ultravon K (sodium salt of sulfonated alkyl benzimidazole); Aeorsol MA (sodium dihexyl sulfosuccinate; Nekal BV (sodium dibutyl naphthalenesulfonate); Dreft (an alkyl sulfate); and Turkey Red Oil.

The solid and liquid formulations can be prepared in any suitable method. Thus, the active ingredients, in finely divided form if a solid, may be tumbled together with finely divided solid carrier. Alternatively, the active ingredients in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredients usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little of 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel carbamates of the present invention can be employed in compositions containing other pesticides, more especially fungicides, insecticides, herbicides, nematocides and bactericides, e.g., phenothiazine, pyrethrum, rotenone, DDT, etc.

In order that those skilled in the art may more completely understand the present invention and the preferred methods by which the same may be carried into effect, the following specific examples are offered:

EXAMPLE 1

Butadiene gas (93.3 g., 1.73 moles), is passed into 313 g. (1.58 moles) of bromotrichloromethane to which has been added 7 g. of a 25% solution of acetyl peroxide in dimethyl phthalate. The mixture is heated to 50° C. during the reaction by means of an ultraviolet lamp, which also serves to catalyze the reaction. The addition of butadiene is carried out over an eight-hour period, during which the temperature of the reaction mixture rises to 110° C. The unreacted bromotrichloromethane is removed by distillation under reduced pressure, and the product, 5-bromo-1,1,1-trichloro-3-pentene, $C_5H_6BrCl_3$, is distilled at 75°–76° C. at a pressure of 1 mm. Hg. The yield is 296 g. or 75% of the theoretical amount. The compound contains, by analysis, 23.71% carbon and 2.36% hydrogen; the calculated values are 23.60% and 2.37%, respectively.

EXAMPLE 2

To 27 g. (0.36 mole) of carbon disulfide which has been cooled to 0° C. is slowly added 25 g. (0.39 mole) of diethylamine, followed by a solution of 16 g. (0.4 mole) of sodium hydroxide in 50 ml. of distilled water and then by 87 g. (0.34 mole) of 5-bromo-1,1,1-trichloro-3-pentene. The temperature is gradually raised and the solution is finally heated under reflux for four hours. After this time the solution is cooled and poured into a large excess of water. The organic layer is separated; the aqueous layer is extracted with chloroform and the extracts are combined with the organic layer which is then dried over magnesium sulfate. After removal of the drying agent by filtration, the solvent is removed by evaporation under reduced pressure. The product, 5,5,5-trichloro-2-pentenyl N,N-diethyldithiocarbamate, $$C_{10}H_{16}Cl_3NS_2$$

an oil, is obtained in a yield of 76 g. (69.7% of the theoretical amount). By analysis, the compound is shown to contain 38.06% carbon and 5.19% hydrogen; the calculated values are 37.50% and 5.00%, respectively.

EXAMPLE 3

To a solution of 40 g. (0.49 mole) of sodium acetate in 200 ml. of glacial acetic acid is added, dropwise, 100 g. (0.40 mole) of 5-bromo-1,1,1-trichloro-3-pentene. The solution is heated under reflux for six hours and then cooled and poured into water. The organic layer is separated; the aqueous layer is extracted with chloroform and the extracts are combined with the organic layer and dried over magnesium sulfate. The drying agent is removed by filtration and the solvent is distilled under reduced pressure. Distillation of the residual oil yields 76 g. of 5,5,5-trichloro-2-pentenyl acetate, $C_7H_9Cl_3O_2$ (83% of the theoretical amount), boiling at 78°–80° C./0.5 mm. Analysis shows 36.46% carbon and 3.77% hydrogen; calculated values are 36.20% and 3.88%, respectively.

EXAMPLE 4

Hydrogen chloride gas is passed into a solution of 76 g. (0.33 mole) of 5,5,5-trichloro-2-pentenyl acetate in 250 g. of absolute methanol for two minutes. The solution is heated under reflux for two hours and the excess methanol and methyl acetate are removed by distillation. The residual oil, upon distillation under reduced pressure, yields 45 g. of 5,5,5-trichloro-2-penten-1-ol, $C_5H_7Cl_3O$ (73% of the theoretical amount), B.P. 80°–87° C./1 mm. By analysis, the compound contains 31.02% carbon and 3.82% hydrogen, as compared with theoretical values of 31.60% and 3.70%, respectively.

EXAMPLE 5 n-Butyl isocyanate (50 g., 0.51 mole) is added dropwise to 70 g. (0.37 mole) of 5,5,5-trichloro-2-penten-1-ol. The mixture is heated on a hot water bath for one hour and finally at 110° C. for four hours. The product, 5,5,5-trichloro-2-pentenyl N-n-butylcarbamate, $$C_{10}H_{16}Cl_3NO_2$$

is obtained by distillation under reduced pressure (B.P. 148°–151° C./0.3 mm.). The yield is 46 g. or 43% of the calculated amount. The following analytical results confirm the proposed structure: Carbon, 42.32%; hydrogen, 6.02% (calculated: 41.70% and 5.50%, respectively).

EXAMPLE 6

*5,5,5-trichloro-2-pentenyl N-n-propylcarbamate*

By the procedure of Example 5, 5,5,5-trichloro-2-pentenyl N-n-propylcarbamate, $C_9H_{14}Cl_3NO_2$, is prepared from 70 g. (0.37 mole) of 5,5,5-trichloro-2-penten-1-ol and 24 g. (0.282 mole) of n-propyl isocyanate. The product, which boils at 125°–126° C. at a pressure of 0.1 mm. of mercury, is obtained in 59% yield (60 grams). The elemental analysis shows 39.56% carbon and 4.79% hydrogen; the calculated values are 39.40% and 5.10%, respectively.

EXAMPLE 7

*5,5,5-trichloro-2-pentenyl N-sec-butyl carbamate*

5,5,5 - trichloro - 2 - pentenyl N - sec - butyl carbamate, $C_{10}H_{16}Cl_3NO_2$, is prepared from 70 g. (0.37 mole) of 5,5,5-trichloro-2-penten-1-ol and 50 g. (0.5 mole) of sec-butyl isocyanate, using the method of Example 5. The product, which is obtained in 43% yield, boils at 134° C. at a pressure of 0.5 mm. of mercury. By analysis, the compound contains 41.71% carbon and 5.53% hydrogen; the calculated values are 41.70% and 5.50%, respectively.

EXAMPLE 8

*5,5,5-trichloro-2-pentenyl carbanilate*

The procedure of Example 5 is employed for the preparation of 5,5,5-trichloro-2-pentenyl carbanilate, $C_{12}H_{12}Cl_3NO_2$, from 70 g. (0.37 mole) of 5,5,5-trichloro-2-penten-1-ol and 18 g. (0.15 mole) of phenyl isocyanate. The product, after purification, melts at 56°–57° C. The proposed structure is confirmed by analytical results of 47.14% carbon and 4.05% hydrogen, as compared with theoretical figures of 46.80% and 4.68%, respectively.

EXAMPLE 9

Phosgene is passed into a solution of 34 g. (0.18 mole) of 5,5,5-trichloro-2-pentene-1-ol in 250 ml. of dioxane until the initial exothermic reaction has subsided. The excess phosgene is then removed by sweeping the solution with dry nitrogen. The solution is washed with petroleum ether and the solvent is removed by distillation. The residual oil is distilled. There is obtained 42 g. of 5,5,5- trichloro-2-pentenyl chloroformate, $C_6H_6Cl_4O_2$ (93% of the theoretical amount), boiling at 74°–76° C./0.4 mm. By analysis, the compound contains 28–51% carbon and 2.47% hydrogen; calculated values are 28–60% carbon and 2.38% hydrogen.

EXAMPLE 10

Methylamine gas is passed into a solution of 55 g. (0.218 mole) of 5,5,5-trichloro-2-pentenyl chloroformate in 70 ml. of carbon tetrachloride until reaction is complete. The mixture is then heated on a hot water bath for two hours. The methylamine hydrochloride is removed by filtration. After distillation of the solvent, the 5,5,5-trichloro-2-pentenyl N-methylcarbamate,

$C_7H_{10}Cl_3NO_2$ is distilled under reduced pressure, B.P. 116°–117° C./0.4 mm. The yield is 36.6 g. (68% of the theoretical amount). The product contains, by analysis, 34.42% carbon and 4.10% hydrogen, as compared with calculated values of 34.00% and 4.03%, respectively.

EXAMPLE 11

*5,5,5-trichloro-2-pentenyl carbamate*

5,5,5-trichloro-pentenyl carbamate, $C_5H_8Cl_3NO_2$, is prepared from ammonia gas and 55 g. (0.2 mole) of 5,5,5-trichloro-2-pentenyl chloroformate by the method of Example 10. The product melts at 94°–96° C. and is obtained in 32% yield. Analysis shows a composition of 30.48% carbon and 3.50% hydrogen, as compared with the calculated values of 31.00% and 3.44%, respectively.

EXAMPLE 12

*5,5,5-trichloro-2-pentenyl N,N-dimethylcarbamate*

Using the method of Example 10, dimethylamine is reacted with 5,5,5-trichloro-2-pentenyl chloroformate (55 g., 0.218 mole) to produce 5,5,5-trichloro-2-pentenyl N,N-dimethylcarbamate, $C_8H_{12}Cl_3NO_2$, in 68% yield. The product boils at 120°–123° C. at a pressure of 0.1 mm. of mercury. The compound contains, by analysis, 37.15% carbon and 4.44% hydrogen; the calculated values are 36.92% and 4.60%, respectively.

EXAMPLE 13

*5,5,5-trichloro-2-pentenyl N,N-diethylcarbamate*

To a solution of 55 g. (0.21 mole) of 5,5,5-trichloro-2-pentenyl chloroformate in 70 ml. of carbon tetrachloride is added, dropwise, 35 g. (0.48 mole) of diethylamine. After workup and purification by the method of Example 10, there is obtained 5,5,5-trichloro-2-pentenyl N,N-diethylcarbamate, $C_{10}H_{16}Cl_3NO_2$, in 80% yield, B.P. 110°–112° C. at a pressure of 0.1 mm. of mercury. Analysis of the product shows 41.16% carbon and 5.46% hydrogen; theoretical values are 41.70% and 5.35%, respectively.

EXAMPLE 14

To a solution of 32.4 g. (0.2 mole) of 2,4-dichloroaniline in 50 ml. of acetone is slowly added 25.2 g. (0.1 mole) of 5,5,5-trichloro-2-pentenyl chloroformate. The mixture is heated under reflux for two hours, after which the precipitated amine hydrochloride is removed by filtration. The acetone is distilled and the residual oil is washed with water. The washings are extracted with chloroform, and the combined organic layer and chloroform extracts are dried over magnesium sulfate. The chloroform is removed by evaporation under reduced pressure leaving 34.7 g. of 5,5,5-trichloro-2-pentenyl 2,4-dichlorocarbanilate, $C_{12}H_{10}Cl_5NO_2$ (92% of the calculated amount). By analysis, the compound contains 38.23% carbon and 2.34% hydrogen, as compared with calculated values of 38.20% and 2.34%, respectively.

EXAMPLE 15

*5,5,5-trichloro-2-pentenyl 2-chlorocarbanilate*

The procedure of Example 14 is employed for the preparation of 5,5,5-trichloro-2-pentenyl 2-chlorocarbanilate, $C_{12}H_{11}Cl_4NO_2$, from 25.2 g. (0.1 mole) of 5,5,5-trichloro-2-pentenyl chloroformate and 25.6 g. (0.203 mole) of o-chloroaniline. The product is obtained in 45% yield. Analysis of the compound shows 42.01% carbon and 3.51% hydrogen; the calculated figures are 42.11% carbon and 3.22% hydrogen.

EXAMPLE 16

*5,5,5-trichloro-2-pentenyl 2,4,6-trichlorocarbanilate*

2,4,6-trichloroaniline, 39.2 g. (0.199 mole) is reacted with 25.2 g. (0.1 mole) of 5,5,5-trichloro-2-pentenyl chloroformate, employing the procedure of Example 14. There is obtained 5,5,5-trichloro-2-pentenyl 2,4,6-tricloro-carbanilate, $C_{12}H_9Cl_6NO_2$, in 52% yield; the product, after recrystallization, melts at 93° C. The compound contains, by analysis, 35.65% carbon and 2.10% hydrogen as compared with theoretical values of 35.00% and 2.18%, respectively.

EXAMPLE 17

*5,5,5-trichloro-2-pentenyl 2,5-dichlorocarbanilate*

By the procedure of Example 14, 5,5,5-trichloro-2-pentenyl 2,5-dichlorocarbanilate, $C_{12}H_{10}Cl_5NO_2$, is prepared from 45.5 g. (0.28 mole) of 2,5-dichloroaniline and 25.2 g. (0.1 mole) of 5,5,5-trichloro-2-pentenyl chloroformate. The product is obtained in 78% yield, and contains, by analysis, 39.47% carbon and 2.71% hydrogen. Calculated values are 38.18% carbon and 2.27% hydrogen.

EXAMPLE 18

*5,5,5-trichloro-2-pentenyl 3-chlorocarbanilate*

By the reaction of 25.2 g. (0.1 mole) of 5,5,5-trichloro-2-pentenyl chloroformate with 25.6 g. (0.203 mole) of m-chloroaniline under the conditions of Example 14, 5,5,5-trichloro-2-pentenyl 3-chlorocarbanilate, $C_{12}H_{11}Cl_4NO_2$, is obtained in 30% yield. Analysis of the product shows 43.82% carbon and 3.32% hydrogen; theoretical values are 42.11% and 3.22%, respectively.

EXAMPLE 19

*5,5,5-trichloro-2-pentenyl morpholinocarboxylate*

Morpholine, 32 g. (0.37 mole), is reacted with 25.2 g. (0.1 mole) of 5,5,5-trichloro-2-pentenyl chloroformate by the procedure of Example 14. 5,5,5-trichloro-2-pentenyl morpholino-carboxylate, $C_{10}H_{14}Cl_3NO_3$, is obtained in 30% yield. Analysis of the product shows 40.64% for carbon and 4.48% for hydrogen. Theoretical values are 39.70% carbon and 4.66% hydrogen.

EXAMPLE 20

To a solution of 60 g. (0.51 mole) of butadiene sulfone in 175 ml. of water is added, dropwise, 146 g. (2 moles) of sec-butylamine. The solution is heated to 75°–80° C. for thirteen hours, after which the water and unreacted amine are removed by distillation under reduced pressure. The product, 3-(sec-butylamino)-1,1-dioxotetrahydrothiophene, $C_8H_{17}NO_2S$, is distilled at 119°–124° C. /.07 mm. The yield is 72 g. or 75% of the theoretical amount.

EXAMPLE 21

To a solution of 10 g. (0.25 mole) of sodium hydroxide in 250 ml. of water is added, with stirring, 47.7 g. (0.25 mole) of 3-(sec-butylamino)-1,1-dioxotetrahydrothiophene. The mixture is cooled to 0° C. and 16.2 g. (0.21 mole) of carbon disulfide is added dropwise. The mixture is stirred at 5°–10° C. for two hours, then allowed to come to room temperature over two hours, and finally heated to 60° C. for two hours. It is then evaporated to dryness, leaving 71 g. of crude sodium N-(sec-butyl)-N-(1,1-dioxotetrahydro-3-thienyl)-dithiocarbamate, $C_9H_{16}NO_2S_3Na$

EXAMPLE 22

Seventy-one grams (0.25 mole) of sodium N-(sec-butyl)-N-(1,1-dioxotetrahydro-3-thienyl)-dithiocarbamate is dissolved in 75 ml. of distilled water and 100 ml. of ethanol. To the solution is added, dropwise, a solution of 60 g. (0.24 mole) of 5-bromo-1,1,1-trichloro-3-pentene in 50 ml. of ethanol. The solution is heated under reflux for six hours and then poured into water. The organic layer is separated and the aqueous layer is extracted with chloroform; the chloroform extracts are combined with the organic layer and dried over magnesium sulfate. After removal of the drying agent by filtration and the chloroform by evaporation under reduced pressure, there remains 94 g. of crude 5,5,5-trichloro-2-pentenyl N-(sec-butyl)-N-(1,1-dioxotetrahydro - 3 - thienyl) - dithiocarbamate, $C_{14}H_{22}Cl_3NO_2S_3$, or 88% of the theoretical amount. The material, initially an oil, crystallizes upon standing for several days; it is then recrystallized from ethanol. The purified solid melts at 103°–104° C. It contains, by analysis, 38.02% carbon and 5.18% hydrogen; the calculated values are 38.40% and 4.80%, respectively.

EXAMPLE 23

Insecticidal evaluation—bean beetle

This procedure is used for testing the insecticidal activities of the compounds described above against the Mexican bean beetle, *Epilachna varivestis*.

The test species is composed of fourth instar larvae, less than one day old within the instar. Paired fully expanded seed leaves excised from Tendergreen bean plants are dipped into the test formulation (2000 p.p.m. of the test chemical, 4% acetone, 0.01% Triton X-155, balance water) and agitated until they are thoroughly wetted. The chemical deposited on the leaves is then dried and the paired leaves are separated. One leaf is placed into each of two Dixie cups (5 oz.) and 10 randomly selected larvae are counted into each Dixie cup which is then covered with a 9 cm. Petri dish cover. These are held at 70° F. for three days, after which mortality and feeding inhibition are determined. The feeding inhibition is an indication of the repellent properties of the test material.) Results are summarized in Table I, column 2.

EXAMPLE 24

Insecticidal evaluation—roach

This test determines the activities of the compounds against the German cockroach, *Blattella germanica*.

Twenty adult males, 7 to 9 weeks old, are anesthetized with carbon dioxide and counted into a 150 ml. beaker. Seventy-five ml. of formulated material (2000 p.p.m. of the test chemical, 4% acetone, 0.01% Triton X-155, balance water) is poured into the beaker containing the roaches. The contents of the roach beaker are immediately poured back into the formulation beaker. This sloshing is repeated three more times and the roaches are immediately screened on a copper screen wire and drained a few seconds on towel paper. Ten of the treated roaches are counted into each of two Dixie cups (3¼″ diameter x 1¼″ deep) which are then capped with Petri dish covers. Mortality counts are made three days after treatment. Results are shown in Table I, column 3.

EXAMPLE 25

Insecticidal evaluation—aphid

The bean aphid (*Aphis rumicis*) is cultured on nasturtium plants, variety Tall Single. No attempt is made to select insects of a given age in these tests.

One day, but not more than two, after transferring aphids to a new flat of nasturtiums, about 2″ tall, grown in 2½″ clay pots, the plants are trimmed so that each pot contains one to five stems with an approximate total of 100 aphids per pot. Spraying is done in a spray hood equipped with a rotating turntable by means of a De Vilbiss paint spray gun (type CH) calibrated to deliver 45 ml. of water in 30 seconds at 30 pounds air pressure per square inch. Forty-five ml. of a formulation containing 2000 p.p.m. of the test chemical, 4% acetone, 0.01% Triton X-155 and the balance water is sprayed. The pots are placed in an inclined position in Dixie cups (3¼″, diameter x 1¼″ deep), over paper marked with a grid. Most dead aphids fall to the paper. Percentage mortality is determined one day after spraying. The results are given in column 4 of Table I.

EXAMPLE 26

Systemic Insecticidal evaluation—aphid

In this test the aphids and nasturtiums are handled exactly as described for the aphid spray test, except that the drainage holes in the pots are plugged with absorbent cotton to prevent possible run-through of the formulation. The dosage is 64 pounds per acre, which is equivalent to 11.2 ml. of the same formulation as employed in Example 25 or 22.4 mg. per 2,5-inch pot. The formulation is poured on the soil after infestation. As in the aphid spray test, the pots are placed in an inclined position in Dixie cups, over paper marked with a grid. Since this is a three-day test, it is necessary to add water to the Dixie cups to prevent wilting of the plants.

Results of this test are summarized in Table I, column 5.

Table I
[Results of insecticide tests (Examples 12-15]

| Compound Tested | Percent Mortality | | | |
|---|---|---|---|---|
| | 2 | 3 | 4 | 5 |
| | M.B.B.[1] | Roach | Aphid Spray | Aphid Systemic |
| 5,5,5-Trichloro-2-pentenyl N,N-diethyldithiocarbamate | | 5 | 87 | 59 |
| 5,5,5-Trichloro-2-pentenyl N-n-butylcarbamate | 35 | | 80 | 25 |
| 5,5,5-Trichloro-2-pentenyl N-n-propylcarbamate | 90 | | 99 | |
| 5,5,5-Trichloro-2-pentenyl N-sec-butylcarbamate | 95 | 55 | 80 | 12 |
| 5,5,5-Trichloro-2-pentenyl carbanilate | | 10 | | 20 |
| 5,5,5-Trichloro-2-pentenyl N-methylcarbamate | 70 | 25 | 45 | |
| 5,5,5-Trichloro-2-pentenyl carbamate | | 60 | 12 | |
| 5,5,5-Trichloro-2-pentenyl N-N-dimethylcarbamate | 65 | 10 | 15 | 33 |
| 5,5,5-Trichloro-2-pentenyl N,N-diethylcarbamate | 80 | 30 | 17 | |
| 5,5,5-Trichloro-2-pentenyl 2,4-dichlorocarbanilate | 35 | 100 | 58 | 18 |
| 5,5,5-Trichloro-2-pentenyl 2-chloro-carbanilate | 60 | 75 | 97 | 21 |
| 5,5,5-Trichloro-2-pentenyl 2,4,6-trichlorocarbanilate | 100 | 100 | 15 | 24 |
| 5,5,5-Trichloro-2-pentenyl 2,5-dichlorocarbanilate | 85 | 65 | 46 | 17 |
| 5,5,5-Trichloro-2-pentenyl 3-chloro-carbanilate | 95 | 10 | 14 | 32 |
| 5,5,5-Trichloro-2-pentenyl 4-morpholinecarboxylate | | 20 | 56 | |

[1] All compounds tested showed greater than 50% feeding inhibition.

EXAMPLE 27

Foliage protectant test against early blight fungus

The tomato foliage disease test measures the ability of the compound to protect tomato foliage against infection by the early blight fungus, *Alternaria solani*. Results from this test indicate whether a compound may have practical use as a foliage protectant fungicide.

The method used employs tomato plants (variety Bonny Best) five to seven inches high and four to six weeks old.

The plants are sprayed with 100 ml. of the basic test formulation employed in Example 23 at 2000 and 400 p.p.m., at 40 pounds air pressure while being rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 20,000 conidia of *A. solani* per ml. The atomizer used delivers 20 ml. in the 30-second exposure period. The plants are held in a saturated atmosphere for 24 hours at 70° F. to permit spore germination and infection before removal to the greenhouse.

After two days from the start of the test, lesion counts are made on the three uppermost fully expanded leaves. The data are converted to percentage disease control based on the number of lesions obtained on the control plants. Results are given here for 5,5,5-trichloro-2-pentenyl N-(sec-butyl)-N-(1,1-dioxotetrahydro-3-thienyl)-dithiocarbamate:

| Concentration p.p.m.: | Percent disease control |
|---|---|
| 2000 | 83 |
| 400 | 58 |

It is to be understood that although the invention has been described with specific reference to particular embodiments thereof, it is not to be so limited, since changes and alterations therein may be made which are within the full intended scope of this invention as defined by the appended claims.

What is claimed is:

1. A compound of the structure $$X_3C\,CH_2CH=CHCH_2Z\overset{\overset{Z}{\|}}{C}-N\overset{R}{\underset{R'}{\diagdown}}$$

wherein X is halogen, Z is selected from the group consisting of O and S and R and R' are each selected from the group consisting of H, lower alkyl, phenyl and halophenyl.

2. 5,5,5-trichloro-2-pentenyl carbamate.
3. 5,5,5-trichloro-2-pentenyl N,N-diethyldithiocarbamate.
4. 5,5,5-trichloro-2-pentenyl N-n-butylcarbamate.
5. 5,5,5-trichloro-2-pentenyl N-n-propylcarbamate.
6. 5,5,5-trichloro-2-pentenyl N-sec-butylcarbamate.
7. 5,5,5-trichloro-2-pentenyl carbanilate.
8. 5,5,5-trichloro-2-pentenyl N-methylcarbamate.
9. 5,5,5-trichloro-2-pentenyl N,N dimethylcarbamate.
10. 5,5,5-trichloro- 2-pentenyl N,N diethylcarbamate.
11. 5,5,5-trichloro-2-pentenyl 2,4-dichlorocarbanilate.
12. 5,5,5-trichloro-2-pentenyl 2-chlorocarbanilate.
13. 5,5,5-trichloro-2-pentenyl 2,4,6-trichlorocarbanilate.
14. 5,5,5-trichloro-2-pentenyl 2,5-dichlorocarbanilate.
15. 5,5,5-trichloro-2-pentenyl 3-chlorocarbanilate.

References Cited by the Examiner

UNITED STATES PATENTS

| 1,915,334 | 6/33 | Salzberg et al. | 260—243 |
| 1,954,517 | 4/34 | Bousquet et al. | 167—22 |
| 1,972,961 | 9/34 | Tisdale et al. | 167—22 |
| 2,041,733 | 5/36 | Werntz | 260—471 |
| 2,075,359 | 3/37 | Salzberg et al. | 167—22 |
| 2,425,320 | 8/47 | Hill | 252—149 |
| 2,425,426 | 8/47 | Joyce | 260—464 |
| 2,606,155 | 8/52 | Hill | 252—149 |
| 2,650,876 | 9/53 | Stewart | 71—2.7 |
| 2,776,197 | 1/57 | Gysin et al. | 260—479 |
| 2,863,488 | 12/58 | Short et al. | 260—471 |
| 3,058,981 | 10/62 | Avakian et al. | 260—247.2 |

NICHOLAS S. RIZZO, *Primary Examiner.*

IRVING MARCUS, *Examiner.*